July 6, 1943.　　　　L. L. SCHAUER　　　　2,323,488
AUTOMATIC REVERSE FOR TAPPING MACHINES
Filed March 9, 1937　　　3 Sheets-Sheet 1

INVENTOR
Lawrence Lee Schauer
BY
Albert F. Nathan
ATTORNEY

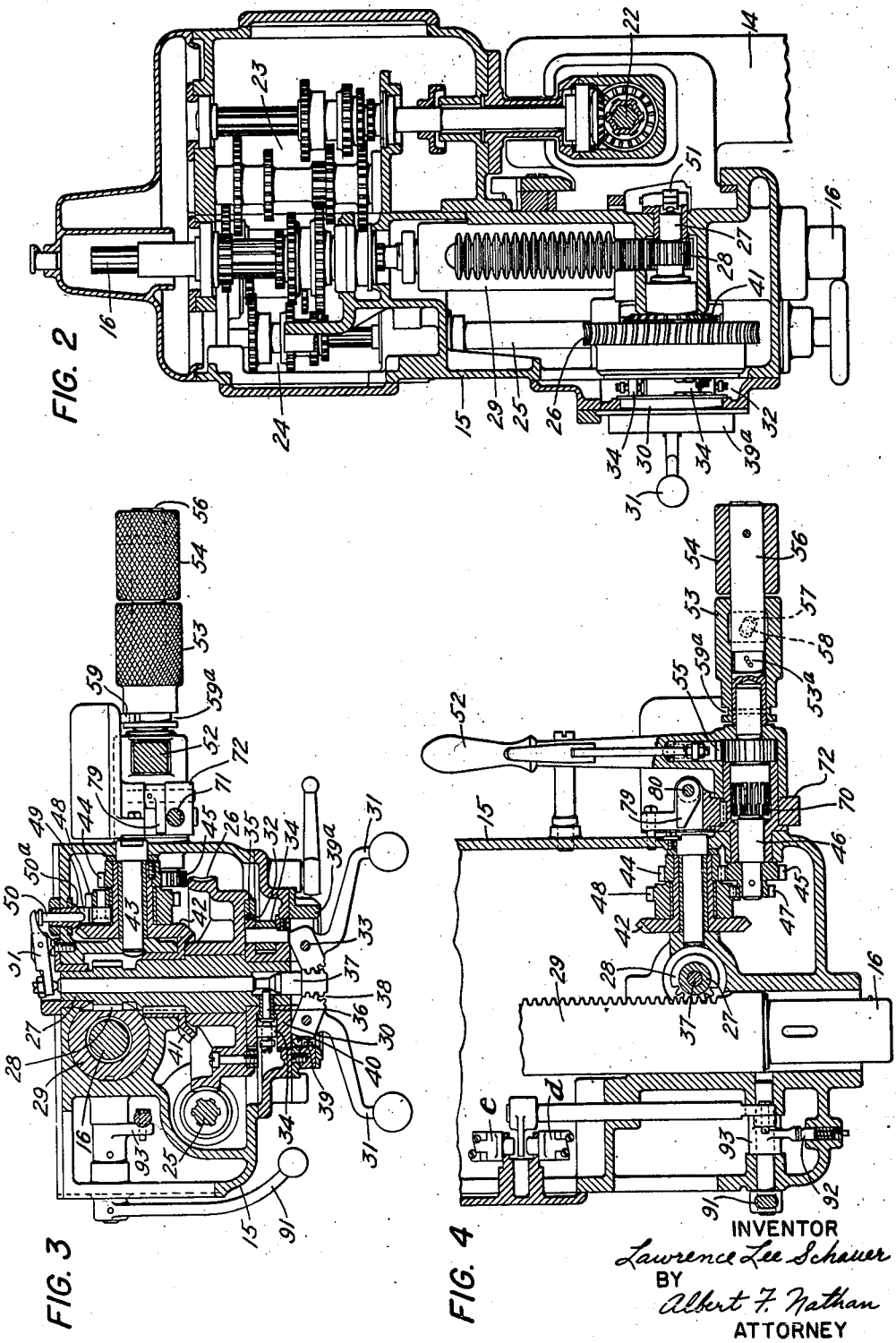
July 6, 1943. L. L. SCHAUER 2,323,488
AUTOMATIC REVERSE FOR TAPPING MACHINES
Filed March 9, 1937 3 Sheets-Sheet 2
INVENTOR
Lawrence Lee Schauer
BY
Albert F. Nathan
ATTORNEY

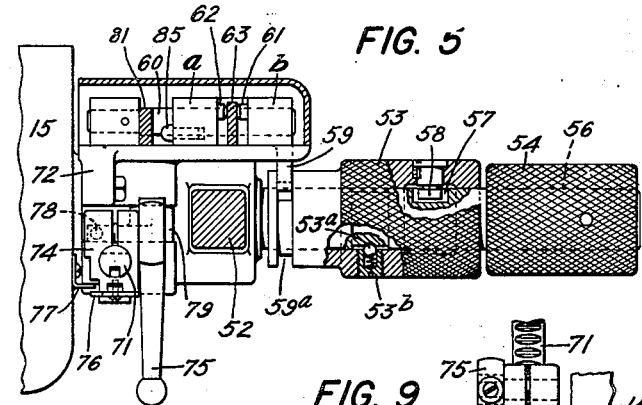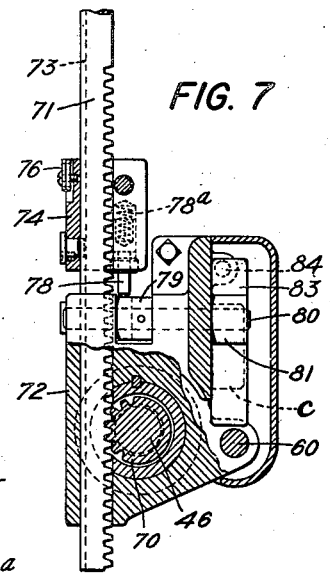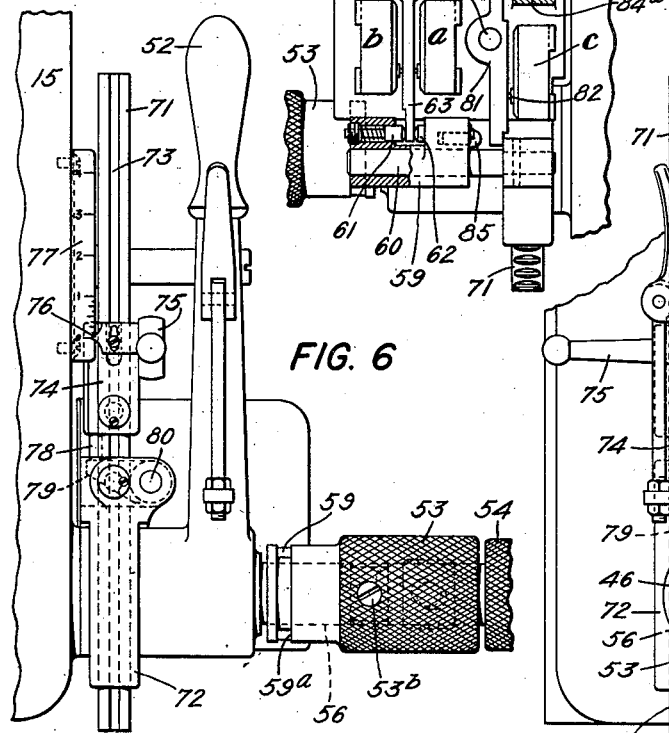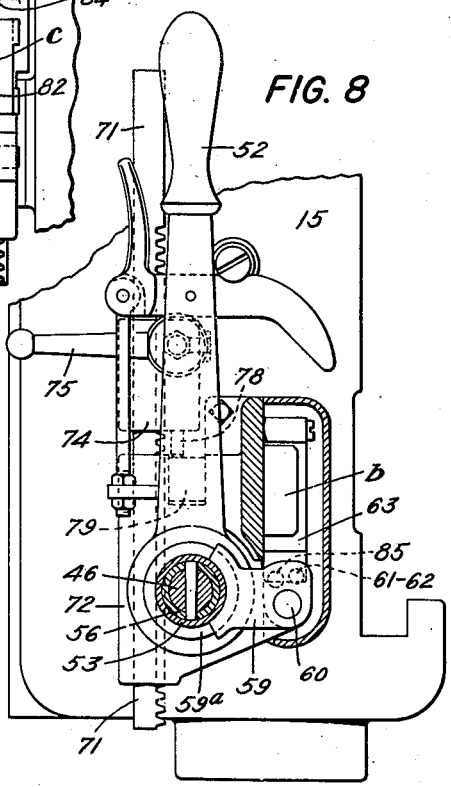

Patented July 6, 1943

2,323,488

UNITED STATES PATENT OFFICE 2,323,488

AUTOMATIC REVERSE FOR TAPPING MACHINES

Lawrence Lee Schauer, Wyoming, Ohio, assignor to The Cincinnati Bickford Tool Company, Cincinnati, Ohio, a corporation of Ohio Application March 9, 1937, Serial No. 129,825

16 Claims. (Cl. 10—136)

The present invention relates to machine tools in general and particularly to improved means for obtaining automatically a reversal in the movement of a tap spindle at a predetermined point in the threading operation.

In my prior application Serial No. 118,245, filed December 30, 1936, there is disclosed a tapping machine which required the attention of the operator to obtain the reversal in the tap spindle at the proper point. Occasionally, a tap was broken or the workpiece damaged because the operator did not manually effect the reverse movement at the point required. This was particularly true in the case of tapping blind holes and in bottom tapping where forward motions of the tap must be stopped before the bottom of the hole is reached. Also, in cases where a succession of holes were to be tapped a predetermined distance, the operator cannot be relied upon to stop and reverse the tap spindle with any uniform degree of precision and this lack of uniformity gave rise to a multitude of problems in subsequently assembling the machine parts.

The present invention has for its primary object to eliminate the breakage to taps and damage to the workpieces by definitely removing or eliminating the need for the attention of the operator at the point of reversal of the tap spindle to the end that a tapping machine may be used for bottom threading blind holes or a series of holes to a given distance without danger of tap breakage.

A further object of the invention is to render available a tapping machine embodying an automatic reversing feature in combination with manually operable means whereby the operator may stop or reverse the spindle motion at any point in the threading cycle as may be warranted by a situation or a condition arising after a threading operation has been started.

Still another object of the invention is to provide a sturdy mechanism and means for automatically effecting a reversal in the rotary motion of the spindle at the definite point, and as a refinement thereof, to provide means for adjusting the precise point of reversal to suit a given threading operation so that the tapping machine may be used for a variety of threading operations and quickly and accurately set for different depths of holes.

The invention further aims to render available a reversing mechanism which is effective only during the normal operation of the machine when set up for manually initiated tapping operations, and is ineffective to start or reverse the rotary motion of the spindle when the operator is translating the spindle by hand, as is customarily done in setting up the machine, or when he has the regular power feed in operation, as is usual in drilling. A safety means of this character not only protects the operator when he is setting up the machine for tapping a hole of a given depth, but also protects the machine and tools used therein should the user inadvertently leave a trip dog in an operative position when the machine is being used for drilling or analogous types of work.

A further object of the invention is to eliminate the conventional mechanical reversers and load and fire mechanisms heretofore customarily embodied, and to accomplish the reversing functions across the neutral zone by much simpler mechanisms relatively inexpensive from the standpoint of initial cost and subsequent maintenance.

In carrying out the objectives of the invention, it is proposed to use a reversible electric motor and connect its output shaft directly with the spindle so that whenever the motor is in operation the spindle will be rotating in a forward or reverse direction depending upon the direction of motor movement. The movements of the motor are preferably controlled by a master reversing switch which in turn is controlled from one or more switches and levers located adjacent the operator's working station.

As the present invention more particularly concerns tapping machines in which the rate of feed of the tap is determined by the lead of the thread being cut, one of the motor control handles is arranged also to propel the spindle axially toward or away from the work. A lost motion mechanism being provided between the handle and the spindle feed mechanism so constructed that the initial movement of the handle in a given direction will effect movement of the motor and tap spindle in the proper direction substantially simultaneously with the axial movements imparted to the spindle through the same control lever. The lost motion connection above mentioned also affords a means for stopping the rotary motion of the spindle at any point in the cycle, and/or reversing the motion of the spindle whenever desired.

In conjunction with the above, additional mechanism has been provided for automatically effecting a reversal in the direction of spindle rotation at a preselected point. In the present embodiment of the invention the automatic reversing means includes a trip switch mechanism which is arranged to be actuated by an adjustable trip plunger operating in timed relation with the axial movements of the spindle. The auxiliary switch means is interconnected with the reversing control circuits of the manual control as to effect a change in rotary movement of the tap from forward through the neutral or the dead zone, to reverse substantially simultaneously with the actuation of the tripping mechanism. By the present invention there is provided a spindle actuated means which definitely insures that the rotary motion of the spindle will be reversed without going dead at the neutral point, and that the reversal will occur at a given point in the axial travel without danger of reversing short of that point, or of going beyond it, which may, in many cases, result in tap breakage.

With a tapping machine so equipped, it will be seen that the production time has been increased materially since every hole will be threaded to the proper point which will be neither too much nor too little for subsequent assembling operations when the tripping mechanism of the present invention has been set at the proper point on the gauge.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 of the drawings represents a machine tool embodying the automatic reversing features of the present invention.

Fig. 2 is a vertical sectional view through the tool head illustrating various elements of the spindle drive train and of the spindle power feed train.

Fig. 3 is a horizontal section through the tool head illustrating more clearly the final elements of the manual and power feed mechanisms for the spindle.

Fig. 4 is a vertical sectional view through the tool head illustrating a portion of the tapping control mechanism.

Figs. 5 and 6 are detail views of the parts of the manual control and automatic tripping mechanisms.

Figs. 7 and 8 are sections of the end views of parts shown in Figs. 5 and 6.

Fig. 9 is a rear view partly in section showing more clearly a preferred means for actuating the reversing switches.

Figure 1:
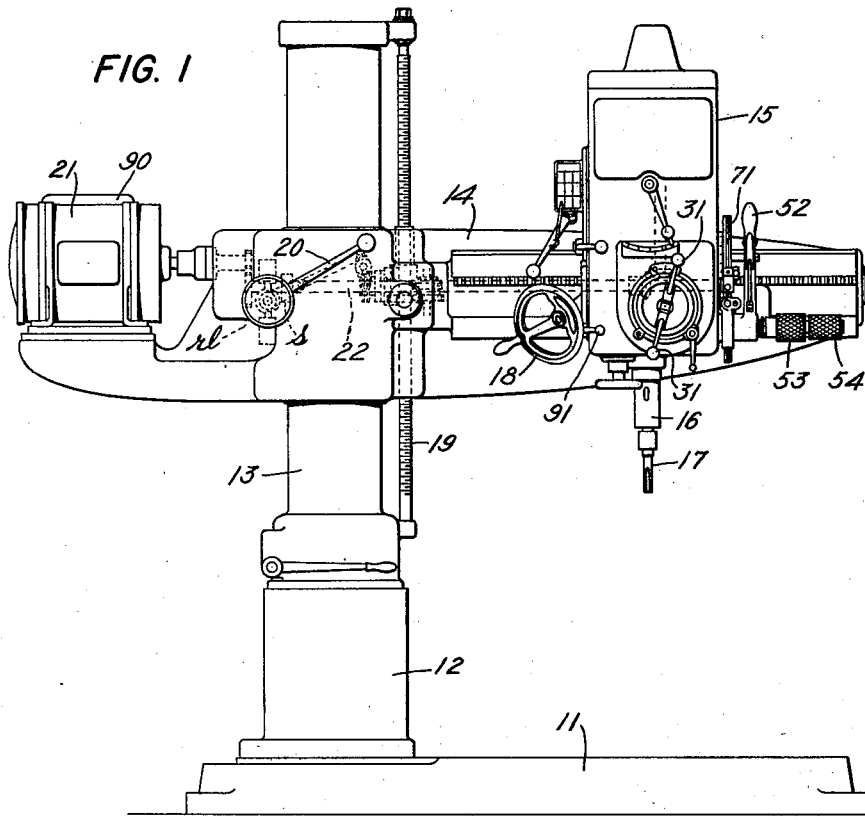

Referring more particularly to the embodiment of the invention shown in Fig. 1, the machine therein illustrated is of the radial drill character and comprises a base member 11 upon which is mounted an upright support 12 for the rotatable sleeve 13, and arm 14 adjustable vertically thereon. The arm 14 supports a tool head 15 within which a rotatable and axially translatable spindle 16 is journaled. The spindle 16 is adapted to drive a tap 17 mounted at its lower end which may be located with respect to the hole to be threaded by adjusting the head 15 bodily along the arm 14 by the hand wheel 18 at the left side of the head. When desired, the arm 14 and parts carried thereby may be adjusted on the sleeve 13 by an elevating mechanism indicated generally as 19, and thereafter clamped by clamping mechanism of which the lever 20 forms a part.

The radial arm 14 also supports a reversible electric motor 21, at the side of the column opposite the tool head which tends to balance the weight of the head on the radial arm. The output shaft of the motor 21 is directly connected to an arm shaft 22 and the latter to the spindle 16 by means of the change speed gearing and shafting 23, illustrated in Fig. 2. Normally the motor 21 is idle or stands stationary.

Power means for feeding the spindle passes from the spindle itself through change gears 24 to a power feed shaft 25 and feed worm wheel 26 that is mounted loosely on a feed pinion shaft 27. The pinion shaft 27 is hollow and carries at its inner end a feed pinion 28 that meshes constantly with rack teeth provided on the translatable, but non-rotatable spindle sleeve 29. The outer end of the feed pinion shaft 27 has keyed thereto a head member 30 which in turn provides the support for a pair of pivotally mounted quick return levers 31. Thus, movement of the quick return levers 31 about the axis of the pinion shaft 27 effects translation of the spindle at a relatively quick traverse rate.

The levers 31 are pivoted at 33 to the head member 30 and also are used to manually engage or disengage a power feed clutch 32 interposed between the worm wheel 26 and the feed pinion shaft 27. The power feed clutch 32 includes two levers 34 that are pivoted to the traverse head 30 and rotated therewith and each is provided with clutch teeth designed to coact with similar clutch teeth 35 carried by the worm wheel 26. Normally the clutch levers 34 are spring pressed out of engagement with the teeth 35, but may be engaged therewith by the radial movement of pins 36 (only one shown) carried by the traverse head 30. One end of each of the pins 36 engages the free end of the clutch levers 34 and the other ends of the pins 36 engage and are actuated by a central cam shaft 37 axially movable in the central bore of the feed pinion shaft. The quick return levers 31 have a tooth and rack connection 38 with the cam shaft 37 whereby the latter may be actuated to cause the pins 36 to be shifted radially outwardly whereby the power clutch 32 is engaged. The converse action follows if the cam shaft 37 is moved in the opposite direction.

The power feed may also be disengaged by means of a trip dog 39 provided by a normally fixed but adjustable ring 39ª. The trip dog 39 is used for drilling purposes and will ordinarily be set to allow the spindle to be fed by power a predetermined distance. When the power feed clutch is engaged an extension 40 from one of the levers 31 lies in the plane of the trip dog 39 and will engage and be shifted by the dog 39 to the position shown in Fig. 3 when the spindle has been advanced to the required point, thus disengaging the power feed clutch. Movement of the quick traverse levers has no effect upon spindle rotation and rotation of the spindle continues.

A safety limit trip and spindle stop is also provided for throwing out the power feed and for stopping translatory movements of the spindle at the upper and lower extremes of available movement. This mechanism is illustrated in Figs. 3 and 4, and includes a gear 41 keyed to the pinion shaft that meshes with a gear 42 journaled on the shaft 43 arranged at right angles thereto. The gear 42 carries a gear 44 that meshes with a gear 45 mounted upon a parallel shaft 46 and the latter gear 45 drives the gear 47 which in turn meshes with a gear 48 loosely mounted on the hub of the gear 42. The driven gear 48 carries a double faced cam 49 which revolves in the plane of a push pin 50 located toward the rear of the tool head. The outer end of the pin 50 engages a pivoted lever 51 which in turn also engages the end of the cam shaft 37. Thus, whenever the spindle is being propelled axially, the cam 49 is revolving, and as the spindle nears either end of its normally available travel, the power feed clutch 32 is automatically disengaged by the action of the cam 49 engaging and shifting the push pin 50. The gear reduction afforded between gears 44, 45, 47 and 48 is such that the cam 49 will make slightly less than one revolution during substantially the full travel of the spindle.

A slight movement of the spindle beyond the point of disengagement of the power feed clutch by the cam 49 brings the cam 49 into engagement with the positive stop 50ª and further translation of the spindle, from whatever cause, is definitely stopped before the feed pinion 28 overruns the cut portion of the spindle sleeve rack teeth. In this way there is provided a safety device which not only prevents the spindle from being fed by power beyond its normal limit, but also prevents movement of the spindle by hand or otherwise beyond its intended range of movement, thus obviating the danger of damage to the spindle sleeve or the feed mechanism.

In addition to the above described mechanism for translating the spindle, a manual feed movement may be imparted thereto through the handles 52, 53 and 54, shown more clearly in Fig. 4. The handle or lever 52 is normally free from the feed shaft 46 but may be latched thereto by the mechanism 55 whenever it is desired to exert a relatively slow but powerful urge on the spindle. The control handle 53 is connected to an extension 56 of the shaft 46 through a helical slot 57 and pin connection 58. The helical slot 57 is formed preferably in the shaft 56, and the pin 58 carried by the control handle 53. The control handle 53 is, accordingly, designed to have a slight axial and angular float with respect to the feed shaft extension 56 before being locked thereto by the roller 58 engaging the end of the helical slot.

The axial movement of the tapping lever operates a set of starting and reversing switches $a$ and $b$, hereinafter to be explained more in detail, through a shifting fork 59 that fits within an angular groove 59ª formed at one end of the control handle. Detent means 53ª provided in part by the control handle 53 and in part by the feed shaft extension 56 are provided for yieldably holding the tapping control handle in its forward, reverse or neutral position.

Briefly, the tapping control mechanism operates as follows: When the control handle 53 is rotated in a counterclockwise direction, as viewed from the right in Fig. 1, it moves axially toward the left and closes the switch $a$, which, through connections hereinafter to be explained, starts the tap spindle rotating in a forward direction. Continued angular movement of the handle 53 in the same direction brings the roller 58 to the end of the slot 57, whereupon the feed shaft is rotated and the spindle is advanced manually. The operator continues manual feed until the tap 17 begins to take hold and cut its thread in the workpiece, and thereafter the tap feeds itself at the rate determined by the lead of the thread. A slight turn of the wrist in the opposite direction shifts the handle to its neutral position, shown in Figs. 4 and 5, switch $a$ is thereby opened and rotary motion of the spindle ceases. A further movement of the handle 53 clockwise shifts the lever to the left which closes the switch $b$ and the spindle at once is driven in the reverse direction and the tap backs out of the threaded hole. When the tap clears the work, the operator may translate the spindle a further distance away from the workpiece by the same control handle 53 or, if desired, by the quick return levers 31 at the front of the tool head.

The switch shifting fork 59 is slidably mounted on a shaft 60 projecting from a fixed part of the head and carries two oppositely disposed spring cushioned plungers 61 and 62 located one at each side of a switch actuating lever 63. The plungers 61 and 62, not only cushion the blows on the switch lever 63, but provide a safety which prevents an undue strain or load from being placed on switches $a$ and $b$, by reason of thoughtless or careless manipulation of the control element. Moreover, the cushioned plungers 61 and 62, in conjunction with the pin and slot connections 57 and 58, insure operation of one of the switches $a$ or $b$, slightly in advance of the axial motion of the spindle imparted through the same control element. Hence, the spindle will be in motion when it is propelled axially through the control element 53 and there is no danger of driving a non-rotating tool into the workpiece. In the event that it is desired not to use the control element 53 to control the rotary motions of the spindle, the control element may be locked to the shaft extension 56 by the set screw 53ᵇ which forms part of the detent mechanism previously referred to.

The handle 54 is locked securely to the feed shaft extension 56 and is provided for translating the spindle up or down, when it is not desired to start the spindle in motion. This handle 54, like the quick return levers 31, has no control over the rotary motions of the spindle, and provides in addition to its spindle translating function, a convenient part through which the operator may exert a force in swinging the arm about the column 12 or in adjusting the head 15 laterally on the radial arm 14 without danger of starting the spindle in operation.

As hereinbefore set forth, one of the aims of the present invention is to eliminate tap breakage and consequent damage to the workpiece resulting from a miscalculation of the time or point of manually reversing the tap spindle. This, and other objectives hereinbefore referred to, are accomplished by the automatic reversing mechanism shown more particularly in Figs. 4 to 10, inclusive. These figures illustrate a preferred means and mechanism constructed and arranged to reverse the direction of rotation of the tap automatically when the predetermined depth of thread has been cut. This mechanism, in general, operates to take over the control initiated by the tapping control handle 53 and subsequently to relinquish that control to the handle 53 when the reverse cycle has been initiated. It will be evident from the following that automatic reversing mechanism, although it definitely controls the point of automatic reversal at which the device has been set, does not preclude the operator from effecting a reversal or a stopping of the spindle prior to reaching that point when desired as, for example, in an emergency.

The automatic reversing mechanism comprises essentially a supplemental gear 70 secured to the feed shaft 46 and a rack bar 71 in mesh therewith. As previously explained, the feed shaft 46 is the driving member when the spindle is being fed through either of the handles 52, 53 or 54, and the shaft 46 is the driven member when the spindle is being fed by power or by the lead of the tap or by the hand levers 31 at the front of the machine. Under all conditions, however, the gear 70 will be rotated whenever the spindle is being translated and this synchronized motion is transmitted to the rack bar 71 slidably mounted in a fixed casing 72.

The rack bar 71 is splined, as at 73, to receive the key of an adjustable tripping dog 74. A hand clamp 75 is provided for conveniently clamping the trip dog 74 in adjusted position on the rack bar 71. The trip dog 74 carries a pointer 76, adjustable relative thereto, which cooperates with a graduated scale 77 secured to the side of the tool head. The scale and pointer 77 and 76 are so related with each other and with the reversing mechanism, that when the pointer coincides with the zero mark on the scale, that is the point automatic reversal will occur. Hence, by bringing the spindle down by hand, with the spindle non-rotating, until the tap touches or is about to touch the workpieces and then adjusting the trip dog 74 until the pointer 76 thereon indicates the length of thread to be cut by the tap, the tap spindle will automatically be reversed when the pointer 76 reaches the zero mark upon the scale. As illustrated in Fig. 6, the pointer 76 may be adjusted relative to the dog 74 to facilitate the assembly and subsequent timing of the mechanism.

Figure 10:
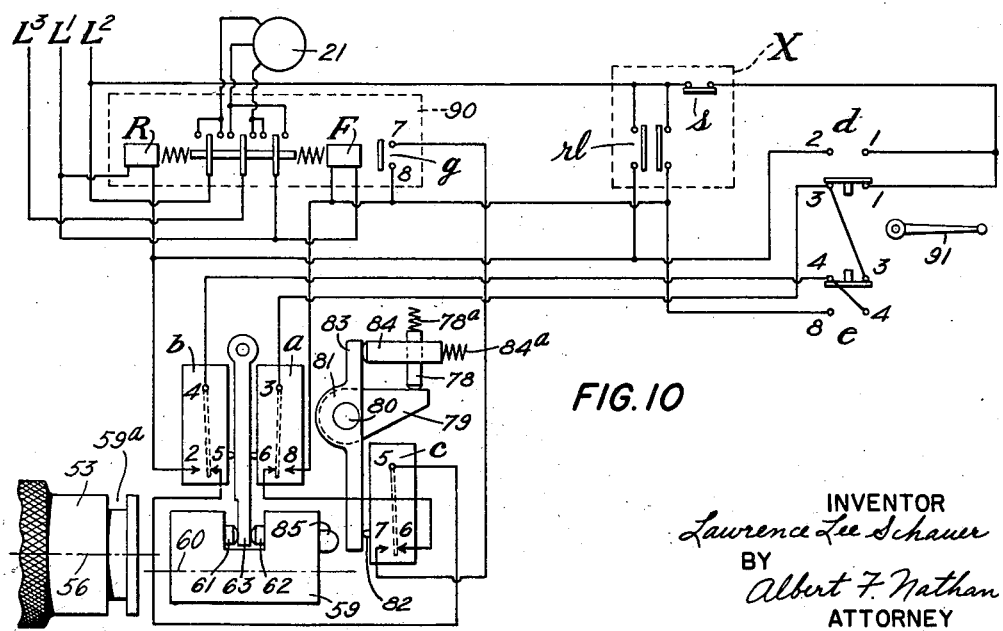
Fig. 10 is a diagram of the electrical control circuits involved.

The trip dog 74 is also provided with a spring pressed plunger 78 laterally offset from the axis of the rack bar 71, which is adapted to engage and rock a switch actuating lever 79 mounted at one end of a shaft 80. The shaft 80 is journaled in bearings provided by the casing 72 and is provided at its inner end with a two-arm switch lever 81. One arm of the switch lever engages the button 82 of a control switch c and the other arm 83 of the lever engages a spring pressed plunger 84. Normally the plunger 84 exerts a preponderating force on the switch lever so that the switch button 82 is held over to a position wherein it makes contact across terminals 5 and 6 (Fig. 10). As the spindle is moved toward the work, the rack bar 71 likewise moves in the same direction, and when the plunger 78 of the trip dog 74 engages and rocks the lever 79, the switch lever 81 is moved away from the button 82 of the switch c and the latter snaps to its other position. This movement of the switch c closes a circuit across contacts 5, 7, and completes a secondary circuit to the forward solenoid F of the master switch 90, through the connections marked 1, 3, 4, 5, 7 and 8. It will be understood, that the spring 78a of the tripping plunger 78 is stronger than the spring 84a of the switch closing plunger 84 so that the former dominates over the latter in actuating the lever 81.

The master control switch 90 is a unit located preferably adjacent the reversible motor 21 on the arm of the machine, and comprises essentially a forward solenoid F and a reverse solenoid R which are operative to throw the switch contacts to cause the motor to run in a forward or reverse direction. The reversing switch and its connections with the motor and power lines L¹, L² and L³, is illustrated diagrammatically in Fig. 10, and operates as follows: When both of the solenoids F and R are de-energized the switch is in neutral and the motor is stationary, and when one of the solenoids is energized the switch is actuated to complete the circuit across one of the sets of contacts and the motor is put in operation. When the solenoid is de-energized the switch springs to its open position and the motor stops. And by reason of the direct acting connections between the motor and tool spindle, it necessarily follows that the spindle movements will follow those of the motor.

In machine tools that are intended to be used for drilling as well as tapping operations, it is essential that the controls for the spindle movements be arranged so that inconsistent or incompatible movements of the various mechanisms be prevented. For example, in tapping operations it is necessary to reverse the tap, but in drilling operations it is advisable not to reverse, and means are provided by this invention to prevent inadvertent reversing of the drill while it is in the hole.

Again, in operations wherein it is necessary to reverse the spindle after it has been fed axially to a given point, it is convenient to have the axially moved member carry the tripping dog so that the position of the dog in relation to some fixed part of the machine, is an accurate indicator of the amount of axial movement of the spindle. Ordinarily, the element translated must throw a clutch, for example, out of forward gear, across neutral, and into reverse gear. In passing from forward gear to neutral, the propelling power stops and there is no movement left to carry the clutch over neutral and into full engagement with the reverse gear.

In the past, mechanical interlocks and load-and-fire mechanisms have been used to carry a part over the dead zone, which have not, however, proved satisfactory for tapping machines and particularly in embodiments such as disclosed herein where the reversing means performs a number of complex functions.

How these various problems have been solved by the present invention is illustrated in connection with Figs. 6-10, Fig. 10 illustrating the various control circuits.

In this figure the switches in the box marked X are actuated by the combined arm clamping and elevating control lever 29, one of the switches rl being closed to raise or lower the arm. This mechanism is disclosed more fully in my copending application and need not be described here, except to state that the arm clamping functions are interrelated with the raising and lowering functions in a manner effectively preventing incompatible movements. Also, since the arm raising and lowering switches rl control the same motor that is used for propelling the tool spindle, a safety switch s is incorporated in the circuit which cuts out all control of the motor from the head controls 91 and 53 whenever the arm is unclamped and about to be raised or lowered.

The electrical control circuits, insofar as they relate to the automatic tapping and reversing features of this invention, are illustrated diagrammatically in the drawings and in which the switches a, b and c are two-way, three pole snap switches of a standard make and are characterized by their ability to make or break a substantially heavy flow of current upon movement of their switch buttons only a small fraction of an inch. The master control switch 90 also controls the starting, stopping and reversing movements of the tap spindle and is located in a box adjacent the motor 21.

Double pole switches $d$ and $e$, represented in the diagram, are the forward and reverse control switches illustrated in Fig. 4 of the drawings, which are arranged to be actuated selectively by the hand lever 91 at the left side of the tool head. Detent means 92, operating upon a bell crank lever 93, is provided for holding the respective switches in their neutral or effective positions. The control lever 91 is used primarily for drilling and has been provided so that the operator can set the spindle operating in a forward direction and control its upward and downward movements through the quick traverse levers 31.

When the machine is set up for a given tapping operation, the control switches $d$ and $e$ are in the position illustrated in Fig. 10, that is, switch $d$ establishes a circuit across lines 1 and 3, and switch $e$ establishes a circuit across lines 3 and 4. Line 3 connects with one of the terminals of the forward switch $a$, and line 4 connects with one of the terminals of the reverse switch $b$. Limit switch $c$ is held in the position shown and when the switches $a$ and $b$ are in the position illustrated, a dead circuit (3, 6, 5, 4, 3) is completed through the limit switch $c$ and the tap spindle is idle.

To start the tap in a forward direction the operator actuates the handle 53 in a counterclockwise direction, the switch $a$ is thrown to its other position and completes the circuit across lines 3 and 8 to the forward solenoid F of the master control switch 90. The solenoid F is thereby energized and throws the master switch to a position such that the motor 21 and the tap spindle operate in a forward direction. Continued movement of the handle 53 in the same direction translates the spindle toward the work, and by reason of the unclamped relation of the head on the arm and the sleeve on the column, the tap may be floated into the hole to be threaded. A slight further urge on the handle 53 causes the tap to start the thread cutting operation and as soon as one or two threads have been cut the tap feeds itself.

As the spindle is fed downwardly the rack bar 71 and trip dog 74 also move downwardly and when the trip plunger 78 engages the switch lever 79 the limit switch $c$ is automatically thrown to the position opposite that shown in Fig. 10. The actuation of the switch $c$ to its opposite position establishes a secondary circuit across contacts 5, 7 to the forward solenoid F.

The switch $a$ which originally completed the circuit to the forward solenoid may then be opened, but the motor and tap will continue to run forward because of the continuing circuit established through the switch $c$. Accordingly, the tap continues to feed forward, the trip plunger 78 continues to rock the lever 79 and arm 81 at its lower end engages the pin 85 on the end of the shifting fork 59. Continued movement of the trip plunger thus opens the switch $a$, and carries the handle 53 and switch arm 63 across their neutral positions and then closes the reverse switch $b$.

It will be seen from Fig. 10, that switches $b$ and $c$ are interconnected, and while the trip switch $c$ held the circuit to the forward solenoid F completed, it did so through the reverse switch $b$. The final part of the movement of switch arm 63, however, closed the circuit across contacts 4, 2 of the switch $b$ and opened the continuing circuit established across 4, 5.

Solenoid F at once becomes de-energized and the reversing solenoid R energized, whereupon the master switch 90 is thrown from its forward position across neutral to its reverse position and the tap spindle is caused to operate in a reverse direction and backs itself out of the hole. The operator may thereafter translate the spindle upwardly a further distance through levers 31, or handles 53 or 54, and stop the rotary motion of the spindle by restoring the handle 53 to its neutral or intermediate position.

As the trip plunger 78, which is synchronized with the movement of the spindle, backs away from the lever 79, 81, the switch $c$ is moved to its former position. And when the tap is out of the hole and handle 53 turned to neutral, the circuit through 1, 3, 4, 5, 6, is again dead.

The mechanism and controlling instrumentalities just described, it will be seen, effectively move the switch shifting lever 63 across its dead zone and no stopping of the forward movements occur until reversal takes place. As a practical matter, the movement of the shifting fork 59 from forward position to reverse position is considerable in relation to the total actual movement of the buttons of switches $a$ and $b$, and this is because it is necessary to provide for a sufficient movement in the handle 53 so that accidental bumping or jarring thereof will not effect an untimely starting or reversing of the motion of the spindle.

Certain additional safeguards are provided, however, in order to make the machine as safe as possible, and one of the safeguards is the supplemental switch $g$ in the line 7—8 to the forward solenoid. The switch $g$ is located in the panel box of the master switch and is moved to its closed position only when the forward solenoid has been energized through another circuit. Thus, in setting up the machine a dead spindle is brought down by hand and there is no danger of the trip plunger 78, when it engages the lever 79 and arm 81 and closes the circuit across 5, 7, of the switch $c$ of starting the tap in motion. The safety switch $g$ being "open" the circuit 1, 3, 4, 5, 7, to the forward solenoid F that the switch $c$ normally would complete when actuated by the trip plunger, is interrupted at the safety switch.

On the other hand, if the machine is set up for drilling, the hand control lever 91 is actuated to its forward position thereby closing the circuit in switch $e$ across contacts 4 and 8. In this set-up the tapping control handle 53 is in neutral and the switches $a$ and $b$ in the positions illustrated in Fig. 10. With the parts so arranged the circuit to the forward solenoid F is through contacts 1, 3, 6, 5, 4, 8, that is, switches $e$, $a$, $b$, $c$, and $d$, are all in series. Therefore, if the operator inadvertently attempts to reverse the spindle by turning the handle 53, the most he can succeed in doing is stopping the machine and no damage is done. This feature provides the user with an additional handle for stopping the spindle in cases of emergency.

Also, if the operator when drilling has forgotten to shift the reverse trip plunger 78 out of the way, the trip plunger will open the switch $c$ when the depth for which it has been set is reached, and again the drill spindle is stopped and no damage is done.

Similar emergency safeguards are provided when the machine is being used as a tapper. Under this condition the hand lever 91 (drill lever) must be in its intermediate or neutral position before the user may exercise any control over the spindle movements through the tapping handle 53. However, should the operator after he has started the spindle rotating forward by means of the handle 53, wish to reverse the movement he may do so by actuating either the handle 53 or lever 91 to its reverse position. When the drill lever 91 is moved to its reverse position the circuit to the forward solenoid is opened across 1, 3, and the circuit to the reverse solenoid established across contacts 1, 2. However, if the reverse tapping cycle has been initiated, either by the manual or the automatic shifting of the tapping control element to its reverse position, and the operator, in confusion, shifts the drill lever 91 to its forward position, the spindle movements stop. Under this condition the reversing circuit was through contacts 1, 3, 4, 2, to the reverse solenoid R and the subsequent movement of the switch d to its forward position opens the circuit across 3, 4. The spindle does not run forward, even though the switch d is closed for the reason the tapping control handle is not in neutral.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. An automatic reversing mechanism for a tapping machine having a rotatable and axially translatable tap spindle, combining reversible power means connected with said spindle for driving same; control means for said power means including an element operable selectively to start, stop or reverse spindle movement; means for feeding said spindle axially; means automatically operable at a preselected point in the axial movement of said spindle for shifting said element from a forward position across neutral to a reverse position; and means operated by the axial motion of said spindle and effective prior to the said shifting of the said element across neutral to continue the operation of said spindle in a forward direction when said element is withdrawn from its forward position.

2. In a tapping machine having a rotatable and axially translatable tap spindle, the combination of a normally idle reversible power means connected with said spindle for driving same, a master control means for said power means, manually operable means for effecting actuation of said control means selectively to start, stop or reverse spindle movements; means automatically operable at a preselected point in the axial translation of said spindle for shifting said manually operated means from its forward position across neutral to its reverse position; means operated by the axial motion of said spindle and effective prior to the said shifting of the manual means across neutral to continue the action of said power means in a forward direction during the said shifting of said manually operated means across its neutral zone; and means effective simultaneously with the said automatic shifting of said manually operated means to its reverse position to discontinue the effective action of said continuing means.

3. In a machine tool the combination of a rotary spindle, of reversible power means connected with said spindle for driving same selectively in reverse directions, of a main control means for said power means comprising a first control means having a neutral and a reverse position and a second control means having a forward and a neutral and a reverse position, each of said control means being capable of movement selectively to their said positions simultaneously or consecutively, and connections between said first and second control means operative to place said second control means in operative relationship with said main control means when the said first control means is in its neutral position, said connections thereby functioning to subdominate the effective action of said second control means to the action of said first control means.

4. In a machine tool the combination of a rotary spindle, of reversible power means connected with said spindle for driving same selectively in reverse directions, of control means for said power means comprising a first control means having forward, neutral and reverse positions and a second control means having a forward, a neutral, and a reverse position, each of said control means being capable of movement selectively to their said positions simultaneously or consecutively; and connections between said first and second control means operative to place all of the functions of said second control means in operative relationship with said first control means when the latter is in its neutral position and the forward function only of said first control means in operative relationship with said second control means when the latter is in its neutral position, said connections thereby functioning to subdominate different functions of the respective control means to the action of the control means that is first actuated to control spindle movements.

5. A machine tool combining a reversible prime mover, a rotatable and axially translatable spindle adapted to be driven thereby, reversing means for said prime mover including a first control means having a forward, reverse and a neutral position and a second control means having a forward, reverse and neutral position, each of said control means being normally capable of movement freely to its respective positions, connections between said first and second control means and between said first control means and said reversing means operative to place all of the said functions of said second control means in series with the said first control means when said first control means is in neutral position, and to place the forwarding function only of said first control means in operative relationship with the functions of said second control means when the latter is in its neutral position, the reversing functions of said first control means remaining effective in any position of said second control means.

6. A machine tool having a rotatable and axially translatable spindle, combining a normally idle reversible power means for rotating the spindle; means for translating the spindle; control means for said power means comprising a controller having a forward and a neutral and a reverse position; a plurality of controls for said controller, one of said controls comprising a handle having a forward, and a neutral, and a reverse position operative to effect actuation of said controller from neutral to its forward position, and another of said controls being operative in timed relation with the forward movement of the spindle to actuate said handle from the said forward position and across neutral to its other effective position without stopping in said neutral position.

7. An automatic reversing mechanism for a machine tool having a rotatable and axially translatable spindle and power means for rotating same selectively in reverse directions, combining manual means for translating said spindle; a hand control element having a forward, a neutral and a reverse position adapted when shifted to its forward position to effect forward rotation of said spindle; manually settable means operated by the axial movement of said spindle for shifting said element automatically across its neutral position to its reverse position thereby to effect rotation of the spindle in the reverse direction; and means automatically effective just prior to the starting of said automatic shifting of said control element for taking over the forwarding control initiated by the manual operation of said element and for retaining said forwarding control during the said automatic shifting of the element through its neutral zone.

8. A machine tool having a rotatable and axially translatable spindle, combining normally idle reversible power means for rotating the spindle; means for translating the spindle; control means for said reversible power means comprising a controller having a forward and a neutral and a reverse position; a plurality of individual controls for said controller, one of said individual controls comprising a hand control element having a forward, and a neutral and a reverse position operative to effect actuation of said controller from neutral to its forward position, and another of said individual controls being operative to shift said hand element automatically from the position to which it had been set manually across neutral to its other effective position at a preselected point in the axial movement of said spindle; and means automatically operating prior to the start of said shifting movement for taking over the forwarding control initiated by said hand element and retaining said control until said element has been shifted to its reverse position.

9. A drilling and tapping machine tool combining a rotatable and axially translatable spindle; normally idle reversible power means for rotating said spindle; control means for said power means comprising a controller, a manually operable drilling control member and a manually operable tapping control member for effecting actuation of said controller, each of said control members having a forward and a neutral and a reverse position, and each member being capable of movement to any position selectively simultaneously or consecutively; and connections between said members and between said members and said controller for rendering the movement of the tapping control member operative only to stop the rotary motion of the spindle when the said drilling control member is in its forward position, and for rendering the movement of the drilling control member effective only to reverse the spindle rotation when the tapping control member is in either of its effective positions.

10. In a machine tool combining a rotatable tool spindle, a normally idle reversible power means connected with said spindle for driving same selectively in reverse directions, a manually operable handle for initially effecting actuation of said power means selectively in a forward or reverse direction, automatic means operative subsequent to the starting of said spindle in a forward direction for continuing said power means effective in a forward direction when said handle is returned to its neutral position, and means thereafter effective automatically to render said continuing means ineffective and to start said spindle operating in a reverse direction.

11. In a machine tool combining a rotatable tool spindle, normally idle reversible power means connected with said spindle for driving same selectively in reverse directions, manually operable element for initially effecting actuation of said power means selectively in a forward or reverse direction, automatic means operative simultaneously with the starting of said spindle in motion in a forward direction for continuing said power means effective in a forward direction; and means thereafter effective automatically to shift said manual element from its forward position across neutral to its reverse position to effect rotation of said spindle in a reverse direction at a preselected point in the cycle, said continuing means operating to maintain the spindle operating in a forward direction during the transition of said manual element through its neutral position.

12. A semiautomatic reversing means for a tapping machine having a rotatable and axially translatable spindle comprising power means for rotating the spindle; a reversing means for said power means; manual means for initially effecting operation of said reversing means to a position in which the spindle will run in a forward direction; means actuated in timed relation with the axial movement of said spindle for automatically shifting said manual means to its reverse position; means actuated by said spindle prior to the shifting of said manual means out of its forward position to maintain said power means and spindle in operation in a forward direction while said manual means is being shifted through its neutral zone; and safety means coacting with said maintaining means for rendering the latter incapable of exercising any control over the movement of the spindle unless said spindle has initially been put in motion by said manual means.

13. A tapping machine combining a rotatable and translatable tap spindle; power means for propelling said spindle; manually operable control means for rendering said power means effective selectively in a forward or reverse direction; means for translating said spindle; means actuated by said spindle and normally operative to reverse a forward running spindle at a given point in its axial translation; and means rendering said last named means ineffective unless said spindle has previously been put in motion in a forward direction.

14. A tapping machine combining a rotatable and translatable tap spindle; normally idle power means for propelling said spindle; manually operable control means for said power means operative to effect reverse rotations thereof; means actuated by said spindle and normally operable to effect a reversal in its rotary motion at a given point in its axial translation; and means rendering said last named means ineffective unless said power means has previously been put in motion by the said manual control means to drive the spindle in a forward direction.

15. A tapping machine combining a rotatable and axially translatable spindle, a handle for translating said spindle axially in either direction; a normally idle reversible power means connected with the spindle for rotating same; reversing means for said power means, operative connections between said handle and said reversing means for rendering the latter effective in a forward direction substantially coincidently with the axial movement imparted to the spindle through the said handle; means automatically operated in timed relation with the axial translation of said spindle for effecting a reversal in the movement of the spindle at a preselected point in the axial travel including an adjustable trip dog and means operated thereby for shifting said handle from its forward position across neutral to its reverse position; and means for continuing the forward movement of said spindle during the shifting movement of said handle across its neutral position.

16. In a machine tool the combination of a rotary spindle, of reversible power means connected with said spindle for driving same selectively in reverse directions, of a control means for said power means including a controller, a first reversing switch means having a forward, a neutral, and a reverse position and a second reversing switch having a forward, and a neutral, and a reverse position; manually operable means for actuating each of said reversing switches, each of said switches being capable of movement selectively to one of their said positions simultaneously or consecutively, and electrical connections between said first and second reversing switches and between said first reversing switch and said controller operative to place said second reversing switch in complete operative relationship with said controller to effect actuation of the controller when the first reversing switch is in its neutral position, and to place said first reversing switch in complete operative relationship with said controller to effect actuation of the controller only when said second reversing switch is in neutral, said electrical connections functioning in a manner subdominating the effective action of each of said two reversing switches to the action of the other.

LAWRENCE LEE SCHAUER.